United States Patent [19]

Freyn et al.

[11] Patent Number: 5,451,417
[45] Date of Patent: Sep. 19, 1995

[54] JUST BAKE FROZEN DOUGH

[75] Inventors: Shelly L. Freyn, Macedon; Deborah E. Freedman, Churchville; David M. King, Fairport, all of N.Y.

[73] Assignee: Van den Bergh Foods Co., Division of Conopco, Inc., Lisle, Ill.

[21] Appl. No.: 54,653

[22] Filed: Apr. 23, 1993

[51] Int. Cl.⁶ .............................................. A21D 6/00
[52] U.S. Cl. .................................. 426/551; 426/524; 426/549
[58] Field of Search ................. 426/551, 524, 549, 19, 426/21

[56] References Cited

U.S. PATENT DOCUMENTS

| | | |
|---|---|---|
| 1,617,514 | 2/1927 | Donovan et al. . |
| 3,096,178 | 7/1963 | Tucker . |
| 3,297,449 | 1/1967 | Baker et al. . |
| 4,283,424 | 8/1981 | Manoski et al. . |
| 4,574,090 | 3/1986 | Paulucci . |
| 4,612,198 | 9/1986 | Wallin et al. . |
| 4,623,542 | 11/1986 | Willin et al. . |
| 4,842,882 | 6/1989 | Paulucci . |
| 4,847,104 | 7/1989 | Benjamin et al. . |
| 4,929,464 | 5/1990 | Willyard et al. ............ 426/524 |
| 4,957,750 | 9/1990 | Chochran et al. . |
| 4,966,778 | 10/1990 | Benjamin et al. . |
| 4,978,544 | 12/1990 | Sexton . |
| 5,094,859 | 3/1992 | Sluimer ........................ 426/524 |
| 5,171,590 | 12/1992 | Sluimer ........................ 426/524 |
| 5,232,727 | 8/1993 | Sugie et al. .................. 426/524 |

OTHER PUBLICATIONS

Samuel A. Matz, PH.D., Formulas and Processes for Bakers, Pan-Tech International, Inc., 1987. pp. 102–103, 290–291.
European Search Report in European Patent Application 94200881.4.
Mrs. Butterworth's Frozen Dough Recipe—Van den Bergh Foods Co., 1991.

*Primary Examiner*—Jeanette M. Hunter
*Assistant Examiner*—Mary S. Mims
*Attorney, Agent, or Firm*—Rimma Mitelman

[57] ABSTRACT

A frozen dough which does not need to be thawed and proofed prior to baking. The dough includes a specific leavening system consisting of sodium or potassium bicarbonate and a leavening acid wherein sodium or potassium bicarbonate is present in the amount of from 3.2% to 3.7% and the leavening acid is present in such an amount as to completely neutralize the bicarbonate. The dough also includes yeast in the amount necessary to impart aroma and flavor of a proofed product.

16 Claims, No Drawings

JUST BAKE FROZEN DOUGH

FIELD OF THE INVENTION

The invention relates to a frozen dough and processes of preparing baked products from the frozen dough.

BACKGROUND OF THE INVENTION

A great variety of frozen dough products have been offered to a consumer in order to minimize the time and the effort of baking the products from "scratch" and to provide the convenience of extended storage time. Commercially available frozen dough products must be "proofed" prior to baking. "Proofing" is the time required for yeast in a dough to produce sufficient amount of carbon dioxide gas to give correct height, volume, and structure in a baked product. Generally, an end user of a frozen dough product is inconvenienced by the need to thaw and proof the product prior to baking. The time required for thawing and proofing is at least 2–4 hours.

Use of chemical leavening agents in place of yeast obviates the need for proofing, but it detracts from the texture, flavor, and structure associated with proofed dough products. An illustrative example is provided by a comparison of a biscuit or Irish soda bread (chemically leavened; unproofed) with a bread loaf, a dinner roll, or a bread stick (yeast leavened; proofed). Proofed products are lighter, less dense, less chewy, more porous, more aerated than chemically leavened unproofed products. With regard to flavor and aroma, it has been found as pad of the present invention that mere addition of a yeast flavor compound to a chemically leavened product does not attain the flavor and aroma of a proofed product.

In some processes described in the art, proofing is carried out (at least to some extent) by a manufacturer of frozen dough products, prior to freezing, so as to minimize or eliminate the need for proofing by the end user. See for example U.S. Pat. Nos. 4,847,104 and 4,966,778 to Benjamin et al. The resultant dough is termed "pre-proofed" frozen dough. A serious drawback of these processes is that they call for special expensive ingredients, e.g., flour containing more than 16% protein. Even more importantly, such processes, at best, shift the burden of proofing from the end user to the manufacturer, increasing production time and cost and, ultimately, increasing cost to consumer. A frozen dough is desirable which does not need to be proofed by either the end user prior to baking or by the manufacturer prior to freezing, yet when baked is substantially similar to a proofed product in texture, flavor, structure, and aroma.

Accordingly, it is an object of the present invention to produce a frozen dough product which does not need to be proofed prior to baking.

It is another object of the present invention to provide a frozen dough which does not need to be proofed yet when baked is substantially similar to a proofed baked product with regard to its flavor, volume, texture, structure, and aroma.

It is still another object of the invention to provide a baked product which is chemically leavened (and thus does not require proofing) yet is substantially similar in appearance, aroma, flavor, and texture to a proofed baked product.

It is yet another object of the invention to provide a process of preparing a baked product from a frozen dough wherein the process does not include thawing or proofing steps.

These and other objects and advantages of the invention will appear as the description proceeds.

SUMMARY OF THE INVENTION

The above objects are accomplished by the present invention which includes a "just bake ®" frozen dough containing:

(a) yeast at a level of from 2% to 20%; and (b) a chemical leavening agent consisting of sodium or potassium bicarbonate and a leavening acid, wherein the bicarbonate is employed in the amount of from 2.5 to 4% and the leavening acid is present in the amount sufficient to completely neutralize the bicarbonate.

The term "just bake" (which is a registered trademark of Van den Bergh Foods Co.) as used herein means that the frozen dough of the invention may be taken out of the freezer and baked, without thawing and/or proofing, to obtain a baked product which is substantially similar in appearance, texture, structure, flavor, and aroma to a baked product which was proofed. The consumer needs only to transfer the frozen product from a freezer to a heated oven. The manufacturer does not need to carry out the proofing either. Yet the baked product obtained from the frozen dough of the invention substantially resembles a proofed baked product in appearance, taste and smell.

Any product that is usually yeast raised may be prepared from the frozen dough of the invention which does not need to be raised (i.e., proofed) prior to baking. Traditional proofed products include bread loaves, rolls (e.g., dinner rolls or sandwich rolls, or cinnamon rolls) and bread sticks, and the frozen dough of the invention is particularly suitable for the preparation of such products.

The invention also includes a process of preparing a baked product substantially similar to a proofed baked product which process is carded out in the absence of a proofing step.

All weight percentages, unless indicated otherwise, are by weight of flour contained in the raw dough prior to freezing. All ratios are by weight of the ingredients.

DETAILED DESCRIPTION

The frozen dough according to the invention contains as a first essential ingredient and a chemical leavening agent.

According to the invention, the term "chemical leavening agent" means a mixture of sodium or potassium bicarbonate with one or more leavening acids. Examples of suitable leavening acids include but are not limited to sodium aluminum phosphate, monocalcium phosphate monohydrate, sodium aluminum sulfate, sodium acid pyrophosphate, dicaldum phosphate, glucono delta lactone, and potassium hydrogen tartrate (cream of tartar), and mixtures thereof. One or more leavening acids may be combined with sodium or potassium bicarbonate to form the chemical leavening agent included in the invention. In order to provide sufficient volume in a baked product, yet avoid alkaline or acidic taste, preferred chemical leavening agent according to the present invention is a mixture of baking soda (sodium bicarbonate) with sodium aluminum phosphate. The optimum chemical leavening agent according to the invention contains a mixture of baking soda and sodium aluminum phosphate in a weight ratio of at least 1:1.1; typically, the ratio is in the range of from 1:1.1 to 1:1.3. In other words, an excess by weight of sodium aluminum phosphate is employed.

It should be understood that the ratio of baking soda to a leavening acid depends on the particular leavening acid employed, but in any event the amount of leavening acid is such that bicarbonate is completely neutralized. The bicarbonate is included in the inventive dough in the amount of from 2.5% to 4%, preferably in the amount of from 3.2% to 3.7% in order to optimize the volume of the product yet avoid alkaline taste.

The frozen dough of the invention includes yeast as a second essential ingredient. Although not wishing to be bound by this theory, it is believed that yeast in the inventive dough does not act as a leavening agent (since the dough does not have to be proofed prior to baking); rather, yeast is added in order to impart to a baked product prepared from the inventive dough the flavor and aroma of a proofed baked product. The frozen dough according to the invention includes yeast at levels typical or greater than those found in yeast-leavened frozen doughs, i.e., 2% to 20%, preferably 4% to 18%. This combination of a full level of yeast and a full level of chemical leavening is key to obtaining the required product quality with regard to taste, flavor and appearance. Traditional frozen dough for preparation of proofed products does not include chemical leavening at levels employed herein; the traditional dough either omits chemical leavening or includes very small amounts of chemical leavening. Yeast included in the inventive dough may be compressed yeast, instant dry yeast, active dry yeast, frozen yeast. Preferred yeast according to the invention is compressed yeast which was found to result in improved stability of frozen dough.

The dough according to the invention includes flour, water, and fat in effective amounts to prepare the dough.

The flour in the present invention may be any finely comminuted meal of any cereal grain or edible seed or mixtures as are typically used in baking. Examples of suitable flours are wheat flour, barley flour, rye flour. Wheat flours are most typically used in baking. Preferred flour used in the preparation of inventive dough is bread flour. Bread flour is a milled, enriched blend of select hard red spring wheats, which generally contains in excess of 10.5% protein and is obtained from straight or long patent flours. Bread flour has high absorption and good mixing tolerance. Preferably in order to obtain improved structure in a baked product, the inventive dough includes at least 15%, by weight of total flour, of high gluten flour. The term "high gluten" as used herein means long patent flour made from high protein (i.e., greater than 11% protein, preferably 13.5–15 % protein). The most preferred high gluten flour included in the inventive dough is long patent flour made from high (13.8–14.2%) protein hard spring wheat. Preferred amount of high gluten flour is from 15% to 30%, preferably in order to optimize structure yet avoid excessive cost the amount is from 20% to 30%.

Water is added to flour and fat in order to prepare the dough. The precise amount of water depends on the type of yeast included. Typically, from 40% to 75% of water is employed, preferably from 45% to 65%. Using less than 40% of water will result in poor processing (tearing/breaking) and in an excessively dry baked product. Using more than 75% of water will result in excessively sticky dough and a gummy baked product.

The dough of the invention includes an effective amount of fat. "Fat" and "shortening" are used interchangeably herein. Shortening may be any oil or higher melting fat which is suitable for use in baked products. Shortenings contribute flavor and texture to the baked goods. Butter and/or margarine is suitable as the shortening. The present shortenings may be solid or plastic as well as liquid or semi-fluid. Glyceride shortenings derived from animal or vegetable fats and oils including synthetically prepared shortenings are suitable for use herein. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Some preferred shortenings are soybean based shortenings or oils, hydrogenated soybean-based shortening or oil, corn oil, palm oil, hydrogenated palm oil, lard and tallow oils. The preferred shortening is a shortening made from a blend of partially hydrogenated and hydrogenated soybean oil, in order to attain optimum eating quality and a consistent internal structure. Shortening is employed in an amount of from 10% to 20%, preferably from 12% to 18%, most preferably from 15% to 17%.

The dough of the invention, preferably contains an oxidizing agent, e.g., calcium peroxide, potassium bromate, potassium iodate, ascorbic acid, azodicarbon amide, calcium bromate, calcium iodate. The oxidizing agent is included in the amount of about 0.4% or less. A preferred oxidizing agent according to the invention is calcium peroxide.

The preferred dough of the invention includes an effective amount of salt and sweetening agent. According to the invention, salt is generally included in an amount of 1–2%; sweetening agent is included in the amount of from 5% to 10%, preferably from 6% to 9%, most preferably in the amount of from 8% to 9%, in order to provide optimum level of sweetness and to optimze flavor. Excessive amount of sweetening agents results in a dark crust in a baked product. The preferred sweetening agent is sucrose.

Other sweeteners suitable for inclusion in the inventive dough include dry or liquid sucrose, invert sugar, maltodextrin, corn syrup, high fructose corn syrup, and mixtures thereof.

Preferably, the inventive dough includes a dough conditioner, which includes various components for improving the structure and texture of a baked product. A dough conditioner typically includes a blend of emulsifiers and oxidizing and reducing agents. A preferred dough conditioner included in the present invention includes an oxidizing agent (described above).

Other preferred ingredients included in the frozen dough according to the present invention are a dairy ingredient and eggs or egg derivative. Examples of suitable dairy ingredients include but are not limited to non fat dry milk, whey, casein, whey protein concentrate, milk and mixtures thereof. Egg derivatives suitable for use herein include yolk, albunmen, dried egg, frozen egg, liquid egg. Most preferably, frozen dough according to the invention includes non fat dairy milk and liquid egg.

Non fat dry milk and egg contributes to the flavor and appearance of the baked product. According to the invention, non-fat dry milk is included in the amount of at least 2.5%, preferably in the amount of from 2.5% to 7%, most preferably the amount is from 2.5% to 5% in order to attain the best flavor and optimize cost. The preferred amount of liquid egg is from 5.5% to 8%, preferably from 5% to 7%, most preferably at least 4.5%, i.e. from 5% to 6%, in order to impart to the baked product improved flavor, yet avoid excessive cost. Whey may be added to the dough, typically in the amount of 1.5%–2.5%. It has been found, however, as part of the present invention that leaving out whey and including liquid egg results in the best appearance.

According to the most preferred embodiment of the invention, frozen dough of the invention contains the following ingredients (amounts calculated prior to freezing):

a) flour which contains 25–35% high gluten flour (protein content of 13.8–14.2%);
b) from 10% to 20% of shortening;
c) a chemical leavening agent which contains baking soda and leavening acid in a ratio which results in complete neutralization of the soda;
d) compressed yeast in the amount of from 6% to 18%, preferably 14% to 15%;
e) from 6% to 9%, preferably 8–9% sucrose;
f) from 2.5% to 7%; preferably from 2.5% to 5% of non fat dry milk;
g) from 0.3% to 0.5% of dough conditioner;
h) from 1% to 2% of salt;
i) liquid egg in an amount of from about 5.5% to about 8%, preferably from about 5% to about 6%;
j) water in an amount of from 40% to 75%, preferably in an amount of from 45% to 65%.

The inventive dough is prepared by mixing, by methods generally known to a baker. According to the preferred method herein, the process for preparing the dough is as follows:

1) Flour, leavening, yeast, salt, conditioner and dry ingredients are mixed;
2) Mix on low for one minute;
3) Add eggs, fat, and water.

In order to improve the aroma and flavor of the baked product even further, yeast may be hydrated with warm water, let ferment for about 10 minutes, and the resultant mixture is then added to the rest of the ingredients.

The resulting mixture is further mixed. The mixing may be carried out in any suitable mixturing apparatus, e.g., Hobart mixer. According to the preferred method herein, dough hook, rather than a paddle, is employed for mixing. Preferably the mixing is carried out in a Hobart mixer, on low speed for 1 to 2 minutes, and then on medium speed for 8 to 10 minutes, in order to attain the best texture in the baked product.

The resulting dough is formed into a desired shape, i.e., shaped into loaves, rolls, or sticks. The resultant shaped dough is frozen, preferably by using spiral freezer ($-34°$ C. to $-52°$ C.). Also can use $CO_2$ or gradual freezing ($-18°$ C. to $-12°$ C.).

The frozen dough of the invention may be stored at a temperature in a range of from $-41°$ C. to $-12°$ C., preferably at a temperature in the range of from $-29°$ C. to $-11°$ C. According to the invention, the frozen dough may be stored for extended periods of time, i.e., at least 16 weeks.

The frozen dough does not need to be thawed or proofed prior to baking, albeit the dough may be thawed and proofed (that is, if thawing and proofing does take place, it will not detract from the quality of a baked product). The dough may be taken directly from the freezer to the oven. The resulting baked product substantially resembles a traditional proofed product in appearance, structure, and taste.

According to the invention, a preferred method of preparing a baked product is by carrying out the following steps:

(a) preparing a dough;
(b) freezing the dough obtained in step (a); and
(c) baking the dough obtained in step (b), without thawing or proofing the dough of step (b).

The dough may be prepared from the frozen dough by carrying out just step (c) in the above process.

The frozen dough is preferably baked at a temperature of 178°–206° C. for 20–30 minutes, most preferably at 206° C. for 30 minutes.

The following specific examples further illustrate the invention, but the invention is not limited thereto.

EXAMPLE I

Three dough samples: A, B and C, each 2,000 grams total weight were prepared from the following ingredients:

| INGREDIENTS | % BY WEIGHT | | |
|---|---|---|---|
| | SAMPLE A | SAMPLE B | SAMPLE C |
| Bread Flour, Untreated | 100% | 100% | 100% |
| Sucrose | 5.68% | 5.36% | 8.49% |
| All Purpose Shortening | 21.29% | 13.39% | 16.98% |
| Non Fat Dry Milk | 4.26% | 4.02% | 4.25% |
| Whey | 2.13% | 2.01% | 2.12% |
| Salt | 1.49% | 1.41% | 1.49% |
| Baking Soda | 3.55% | 3.35% | 3.54% |
| Sodium Aluminum Phosphate | 3.55% | 3.72% | 3.93% |
| Dough Conditioner* | 0 | 0.67% | 0.71% |
| Yeast** | 0 | 6.70% | 7.08% |
| Water | 74.52% | 70.31% | 70.75% |

*Contained soy flour, calcium sulfate, salt, dicalcium phosphate, calcium dioxide and ammonium phosphate
**Compressed Yeast Processing Samples A & B All ingredients except water were mixed together, water (10° C.–16° C.) was added, and mixing carried out in a Hobart mixer, with a paddle on low speed for one minute and on medium speed for four minutes.

Sample C

Two trials were run for Sample C:

Trial 1: The same procedure was followed as for samples A and B;

Trial 2: The same procedure was followed as in Trial 1, except that mixing was carried out with a dough hook (instead of a paddle) on low speed for one minute and on medium speed for ten minutes (instead of four minutes).

For all samples, dough was shaped into rolls. The rolls were frozen directly after mixing (no proofing step). After 24 hours in frozen storage all rolls were baked without thawing or proofing, at 400° F. for 15–25 minutes.

Observations

Sample A (not within the scope of the invention) was dense, biscuit-like, chewy, did not resemble the texture, flavor, and structure of a yeast-raised roll.

Sample B (within the scope of the invention) was much closer to the texture and flavor of a proofed dinner roll than Sample A.

Sample C (within the scope of the invention) which contained more fat and sucrose than Sample B was even better than Sample B in approximating the texture, flavor, and structure of a proofed roll. Trial 2 of Sample C (using a dough hook instead of a paddle and employing longer mixing time) attained the best result (particularly with regard to texture) among the samples of Example 1.

EXAMPLE 2

Dough was prepared using the following ingredients:

| INGREDIENTS | PERCENT BY WEIGHT |
| --- | --- |
| Bread Flour, Untreated | 100% |
| Sucrose | 8.49% |
| All Purpose Shortening | 16.98% |
| Non Fat Dry Milk | 4.25% |
| Dough Conditioner | 0.71% |
| Whey | 2.12% |
| Salt | 1.49% |
| Soda | 3.54% |
| Sodium Aluminum Phosphate | 3.93% |
| Yeast* | 7.08% |
| Water | 67.92% |

*Dry yeast

Processing

All ingredients, except water and yeast, were premixed. Yeast was hydrated with water, and the resulting slurry was let sit for ten minutes and subsequently was mixed with the rest of the ingredients according to the procedure described for Trial 2, Sample C, Example 1.

The resultant dough was formed into rolls and the rolls were frozen as in Example 1. The rolls were baked at 400° F. for 30 minutes.

Observations

Use of dry yeast instead of compressed yeast resulted in impovement over Example 1, Sample C (Trial 2). The yeast flavor and aroma were more pronounced, when compared to rolls of Samples B and C of Example 1.

EXAMPLE 3

Dough was prepared using the following ingredients:

| INGREDIENTS | PERCENT BY WEIGHT |
| --- | --- |
| Bread Flour, Untreated | 100% |
| Sucrose | 6.77% |
| All Purpose Shortening | 16.26% |
| Non Fat Dry Milk | 2.98% |
| Dough Conditioner | 0.68% |
| Salt | 1.63% |
| Baking Soda | 3.39% |
| Sodium Aluminum Phosphate | 3.77% |
| Yeast* | 6.77% |
| Water | 67.73% |

*Dry yeast

Processing and Observations

As in Example 2, except that the rolls were baked for 25 minutes. Example 3 had an offnote in flavor, possibly due to lower level of non fat dry milk.

EXAMPLE 4

Dough was prepared using the following ingredients:

| INGREDIENTS | PERCENT BY WEIGHT | |
| --- | --- | --- |
| | SAMPLE A | SAMPLE B |
| Bread Flour, Untreated | 80% | 80% |
| Bread Flour, Hi Gluten | 19.99% | 19.99% |
| Sucrose | 8.43% | 8.43% |
| All Purpose Shortening | 16.86% | 16.86% |
| Non Fat Dry Milk | 5.62% | 5.62% |
| Dough Conditioner | 0.70% | 0.70% |
| Whey | 0.00% | 0.00% |
| Salt | 1.48% | 1.48% |
| Baking Soda | 3.51% | 3.51% |
| Sodium Aluminum Phosphate | 3.91% | 3.91% |
| Yeast* | 5.62% | 5.62% |
| Liquid Egg | 0% | 7.03% |
| Water | 70.25% | 66.04% |

*Dry yeast

Processing, freezing and baking was carried out as in Example 2.

Observations

This Example, which incorporated about 20% (by weight of total flour) of high gluten flour, resulted in the best "tear apart" roll-like texture among rolls of Examples 1–4.

Samples A and B were identical, except that Sample B further contained liquid egg and Sample A contained more water than Sample B. Liquid egg was added to water after yeast. Sample B was improved over Sample A in that Sample B had milder aroma and more golden appearance than Sample A.

EXAMPLE 5

Dough was prepared using the following ingredients:

| INGREDIENTS | PERCENT BY WEIGHT | |
| --- | --- | --- |
| | SAMPLE A | SAMPLE B |
| Bread Flour, Treated | 70% | 70% |
| Bread Flour, Hi Gluten | 30% | 30% |
| Sucrose | 8.43% | 8.43% |
| All Purpose Shortening | 16.86% | 21.07% |
| Non Fat Dry Milk | 5.62% | 7.02% |
| Dough Conditioner | 0.70% | 0.70% |
| Whey | 0.00% | 0.00% |
| Salt | 1.48% | 1.48% |
| Baking Soda | 3.51% | 3.51% |
| Sodium Aluminum Phosphate | 3.91% | 3.91% |
| Yeast* | 5.62% | 16.86% |
| Liquid Egg | 5.62% | 5.62% |
| Water | 63.23% | 63.23% |

*Sample A - dry yeast; Sample B - compressed yeast

Processing, freezing and baking was carried out as in Example 2.

Observations

Sample A and Sample B differed primarily in the type and amount of yeast that was included. Sample A had stronger yeast notes than Sample B. Prolonged freezer storage demonstrated, however, that due to the higher level of glutathione in dry yeast, storage stability of samples containing dry yeast was decreased compared to the storage stability of samples containing compressed yeast. Glutathione weakens the gluten network causing structure collapse. Compressed yeast provided a product which was consistent over time.

EXAMPLE 6

Dough was prepared using the following ingredients:

| INGREDIENTS | PERCENT BY WEIGHT |
| --- | --- |
| Bread Flour, Treated | 70.94% |
| Bread Flour, Hi Gluten | 29.06% |
| Sucrose | 8.19% |
| Shortening-Liquid** | 16.37% |
| Non Fat Dry Milk | 2.73% |
| Dough Conditioner Paniplus M | 0.50% |
| Salt | 1.43% |
| Baking Soda | 3.41% |
| Sodium Aluminum Phosphate | 3.79% |
| Yeast* | 4.77% |
| Liquid Egg | 5.46% |
| Water | 58.6% |

*Dry yeast
**Partially hydrogenated soybean and cottonseed oils.

Processing, Freezing and Baking

As in Example 2, except that a slurry of water and yeast was not prepared. Egg, yeast, and water were added to the rest of the ingredients, in the order listed. Also, this example was a plant production scale run. 600 pounds of dough were prepared.

Observations

The resulting baked rolls were substantially similar to proofed baked rolls in texture, flavor, and structure, even though no proofing was carried out, either before freezing or after freezing, before baking. Example 6 also employed different shortening (compared to Examples 1–5). The use of this shortening in Example 6 resulted in the best overall texture among the rolls of Examples 1–6.

EXAMPLE 7

Dough was prepared using the following ingredients:

| INGREDIENTS | PERCENT BY WEIGHT |
| --- | --- |
| Bread Flour | 71% |
| Bread Flour, Hi Gluten | 29% |
| Sucrose | 8.19% |
| Non Fat Dry Milk | 2.73% |
| Salt | 1.5% |
| Dough Conditioner | .51% |
| Baking Soda | 3.41% |
| Sodium Aluminum Phosphate | 3.79% |
| Shortening Liquid | 16.38% |
| Compressed Yeast | 14.33% |
| Liquid Egg | 5.46% |
| Water | 47.78% |

Processing, Freezing and Baking

As in Example 6. Example 7 was also a plant production scale run: 600 pounds of dough were prepared.

Observations

The rolls were substantially similar to proofed baked rolls.

If not otherwise mentioned in the description, the materials employed in the Examples were obtained from the following suppliers:

Materials and Suppliers:

| MATERIAL | DESCRIPTION OR TRADEMARK | SUPPLIER |
| --- | --- | --- |
| Bread Flour, Untreated | Spring Maide | Cargill |
| Bread Flour, Treated | | Cargill |
| | | Conagra |
| | Flour Enrichment Blend | ADM Arkady |
| Bread Flour, Hi Gluten | | Pillsbury |
| | Hummer High Gluten | Cargill |
| Sucrose | | Savannah Foods |
| | | Colonial Sugars Inc. |
| All Purpose Shortening | Hydrogenated Soybean Oil | Honeymead |
| Non Fat Dry Milk | | Michigan Milk Product Assoc. |
| | | AMPI Regional; |
| | | San Joaquin Valley Dairymen; |
| | | Kudsen Dairy Group; |
| | | Dairy Gold Inc.; |
| | | Mid American Farms |
| Whey | | Sorrento Cheese Co. |
| Salt | | Cargill Protein Products |
| | Purex Fine Prepared | Morton Salt |
| Soda | | Fleishmann's Yeast Co. |
| | | Rhone-Poulenc |
| Sodium Aluminum Phosphate | SALP/H$_2$O | Levair Rhone-Poulenc |
| Dough Conditioner | Paniplus M | ADM Arcady |
| Yeast (Compressed) | | Fleischmann's Yeast Inc. |
| Yeast (Dry) | | SAF Products Corp. |
| Yeast Flavor | | Integrated Ingredients |
| | Deactivated Yeast | SAF Products Corp. |

It should be understood that the specific forms of the invention herein illustrated and described are intended to be representative only. Changes, including but not limited to those suggested in the specification, may be made in the illustrative embodiments without departing from the dear teachings of the disclosure. Accordingly, reference should be made to the following appended claims in determining the full scope of the invention.

What is claimed is:

1. A non-proofed frozen dough suitable for baking without proofing or thawing comprising flour, shortening, fat, water, and yeast in the amount of from 2% to 20%, and a chemical leavening agent consisting of sodium or potassium bicarbonate and a leavening acid wherein sodium or potassium bicarbonate is present in the amount of from 2.5% to 4% and the leavening acid is present in such an amount as to completely neutralize the bicarbonate.

2. The dough of claim 1 wherein the yeast is compressed yeast.

3. The dough of claim 2 wherein the amount of the compressed yeast is in a range of from 6% to 18%.

4. The dough of claim 1 further comprising egg or egg derivative.

5. The dough of claim 1 wherein at least about 15% of the flour, by weight of total flour, is a flour blend with a protein content of at least 11%.

6. The dough of claim 1 wherein the leavening acid is selected from the group consisting of sodium aluminum phosphate, monocalcium phosphate monohydrate, sodium aluminum sulfate, sodium acid pyrophosphate, dicalcium phosphate, glucono delta lactone, potassium hydrogen tartrate, calcium pyrophosphate, and mixtures thereof.

7. The dough of claim 1 wherein the leavening acid is primarily sodium aluminum phosphate.

8. The dough of claim 1 wherein at least 80% by weight of total leavening add is sodium aluminum phosphate.

9. The dough of claim 1 wherein the amount of yeast is in a range of from 7% to 18%.

10. The dough of claim 1 wherein the amount of sodium or potassium bicarbonate is from 3.2% to 3.7%.

11. The dough of claim 1 wherein the dough comprises from 10% to 20% of shortening.

12. The dough of claim 1 wherein the dough further comprises an oxidizing agent.

13. The dough of claim 12 wherein the oxidizing agent is calcium peroxide.

14. The dough of claim 1 wherein the dough further comprises a dairy ingredient.

15. The dough of claim 1 wherein the dough further comprises a sweetening agent.

16. A process of preparing a baked bread or roll product, the process comprising:
 (a) preparing a non-proofed dough;
 (b) freezing the non-proofed dough obtained in step (a); and
 (c) baking the non-proofed dough obtained in step (b), without thawing or proofing the dough of step (b),
 wherein the dough in step (a) comprises yeast in the amount of from 2% to 20% and a chemical leavening agent consisting of sodium potassium bicarbonate and a leavening acid, wherein sodium or potassium bicarbonate is present in the amount of from 2.5% to 4% and the leavening acid is present in such an amount as to completely neutralize the bicarbonate.

* * * * *